United States Patent [19]

Kinoshita et al.

[11] Patent Number: 5,416,715
[45] Date of Patent: May 16, 1995

[54] APPARATUS FOR GRAPHICALLY CHECKING FOR INTERFERENCE BETWEEN A WORKPIECE AND A TOOL

[75] Inventors: Jiro Kinoshita; Youichi Hamada, both of Minamitsuru, Japan

[73] Assignee: Fanuc Ltd., Yamanashi, Japan

[21] Appl. No.: 122,505

[22] PCT Filed: Jan. 27, 1993

[86] PCT No.: PCT/JP93/00098

§ 371 Date: Oct. 1, 1993

§ 102(e) Date: Oct. 1, 1993

[87] PCT Pub. No.: WO93/15450

PCT Pub. Date: Aug. 5, 1993

[30] Foreign Application Priority Data

Feb. 3, 1992 [JP] Japan ................................ 4-017815

[51] Int. Cl.⁶ ............................................. G06F 15/46
[52] U.S. Cl. ........................ 364/474.2; 364/474.24; 364/474.26; 395/135
[58] Field of Search ............. 364/474.2–474.26, 364/474.34; 395/133–139

[56] References Cited

U.S. PATENT DOCUMENTS

| | | | |
|---|---|---|---|
| 4,922,440 | 5/1990 | Kawamura et al. | 364/474.22 |
| 5,043,906 | 8/1991 | Jepson | 364/474.34 |
| 5,122,966 | 6/1992 | Jansen et al. | 364/474.2 |
| 5,307,454 | 4/1994 | Shin | 395/133 |
| 5,315,523 | 6/1994 | Fujita et al. | 364/474.22 |

FOREIGN PATENT DOCUMENTS

| | | |
|---|---|---|
| 62-136340 | 6/1987 | Japan . |
| 63-64107 | 3/1988 | Japan . |
| 63-207537 | 8/1988 | Japan . |

*Primary Examiner*—Roy N. Envall, Jr.
*Assistant Examiner*—Thomas E. Brown
*Attorney, Agent, or Firm*—Nikaido, Marmelstein, Murray & Oram

[57] ABSTRACT

An apparatus for graphically checking for possible interference between bodies that are independently moveable with respect to each other, including CPU means for creating separate time sequential two dimensional images of the separate bodies in pixels of different colors, memory for storing superimposed pixel images of the bodies as a single frame wherein superimposed pixels are stored as a combined pixel of the superimposed colors, a parallel/series converter for scanning each row of the stored frame, and a comparator for comparing each pixel with the next succeeding scanned pixel and determining if a color difference exists between two adjacently positioned pixels, an interruption signal being generated when such color difference exists.

3 Claims, 4 Drawing Sheets

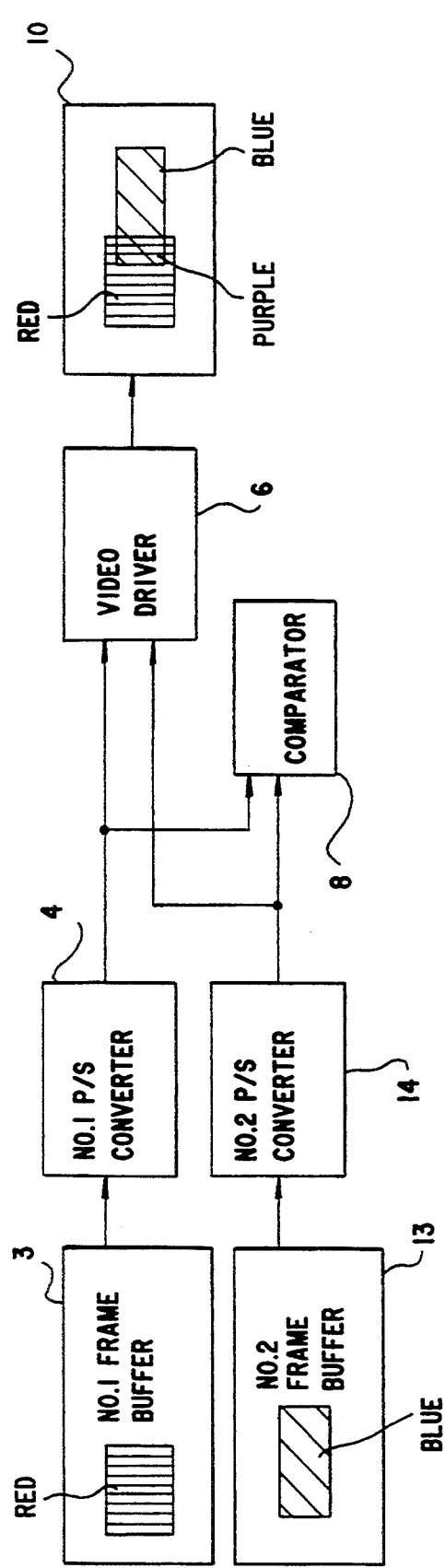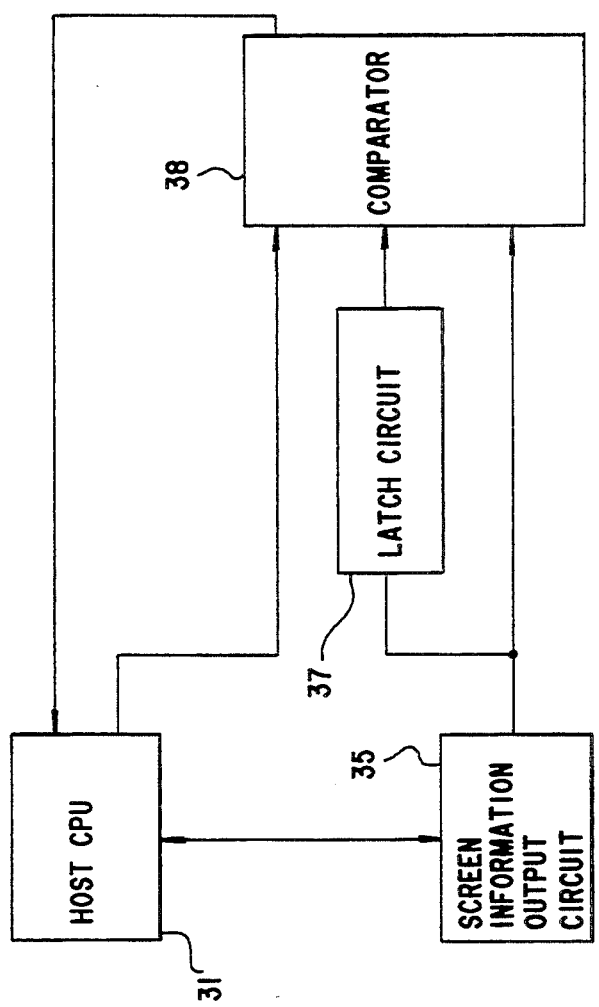
Fig.2 PRIOR ART
Fig.3

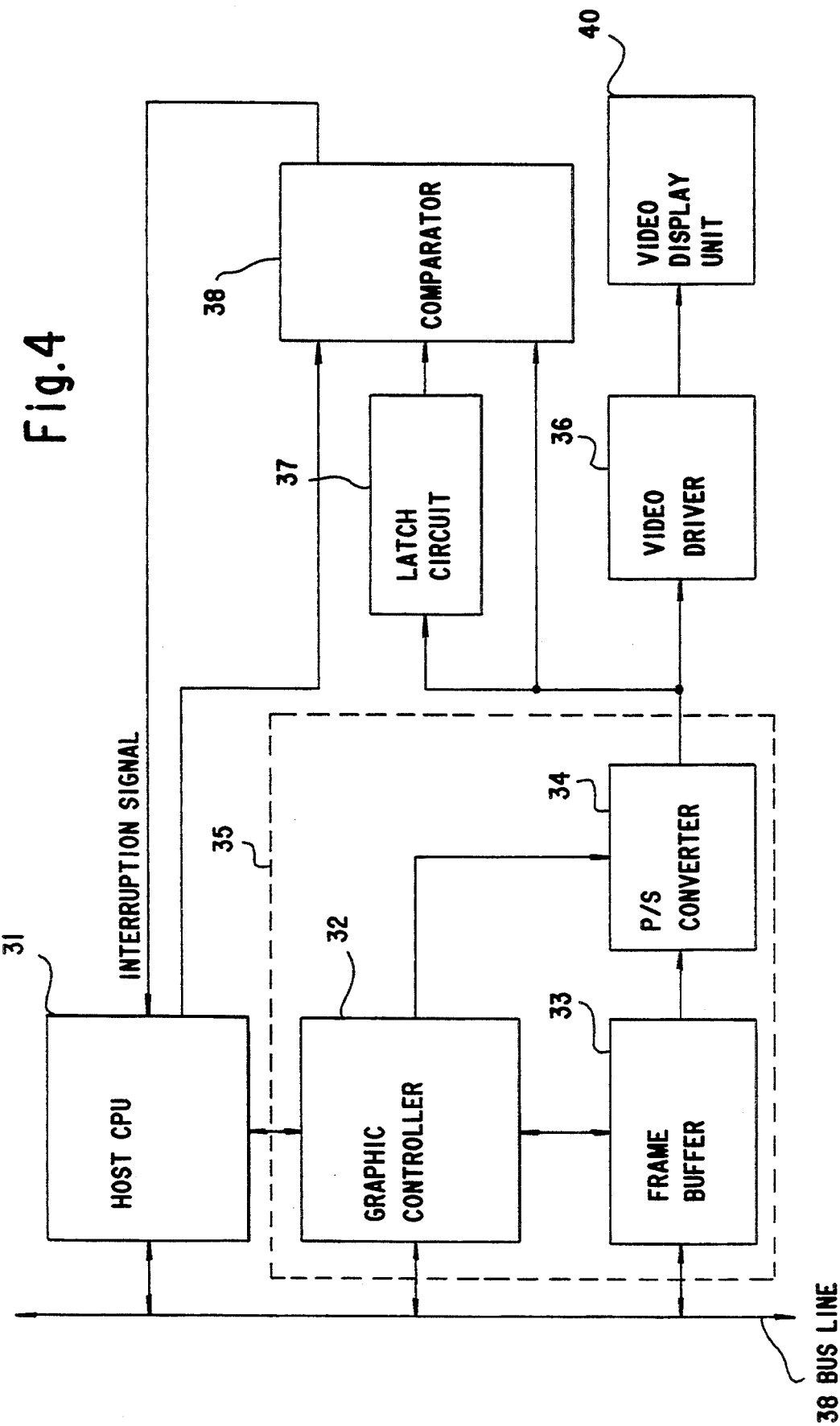

TWO ADJACENT PIXEL DATA

TWO ADJACENT PIXEL DATA

APPARATUS FOR GRAPHICALLY CHECKING FOR INTERFERENCE BETWEEN A WORKPIECE AND A TOOL

TECHNICAL FIELD

The present invention relates to CNC machine tools, industrial robots and graphic systems, and more particularly to an apparatus for graphically checking for spatial interference between a workpiece and a tool or the like during machining, in accordance with a machining program, by a CNC (Computer Numerically Controlled) machine tool by means of a graphic display.

BACKGROUND ART

At the present time, CNC machine tools with a graphic display include an apparatus for graphically checking for interference between machining cutters that cut a workpiece or between a cutter and a workpiece clamp(chuck), before machining the workpiece in accordance with an NC program, by means of CRT display showing simulation of the machining process of the workpiece as graphical images so that operators can find the interference.

This apparatus for graphically checking for interference between a workpiece and a tool, displays workpiece shapes before and after machining the workpiece, chuck shapes, tail stock shapes, tool shapes on cutting tables or the like on a CRT screen, and displays a tool path in which the tool moves in accordance with an NC program on the CRT screen, and allows to monitor the interference. An example of this apparatus will be explained below.

FIG. 1 is a drawing showing the structure of an apparatus for graphically checking for interference between a workpiece and a tool of a machining program disclosed in the prior art. This apparatus includes a host computer 1 controlling the general operations of a numerical controller, a graphic controller 2, connected to the host computer 1, which controls screen information having a plurality of graphic images, a NO.1 frame buffer 3, connected to the graphic controller 2, which stores screen information including a graphic image of a body (any part of a workpiece or a tool) for machining in accordance with a machining program, a NO.2 frame buffer 13, connected to the graphic controller 2, which stores other screen information including a graphic image of another body for machining in accordance with the machining program, a NO.1 P/S converter 4 that receives parallel signals from the NO.1 frame buffer 3, converts the parallel signals into serial signals, and outputs the serial signals in accordance with a command signal from the graphic controller 2, a NO.2 P/S converter 14 that receives parallel signals from the NO.2 frame buffer 13, converts the parallel signals into serial signals, and outputs the serial signals in accordance with another command signal from the graphic controller 2. The apparatus also includes a comparator 8 that receives outputs from the NO.1 P/S converter 4 and from the NO.2 P/S converter 14, compares the outputs continually, and outputs an interruption signal to the host CPU 1 when it detects interference.

The comparator 8 detects interference whether or not the pixel data in the comparator 8, previously set by the host computer 1, indicates two different bodies for interference checking, are input at the same time. When it is determined that the pixel data are input at the same time, then it determines that there is interference.

A video driver 6 outputs a video signal, as screen information, to the video display unit 10, on which the graphic images are displayed, after combining the output from the first P/S converter 4 with the output from the second P/S converter 14.

Furthermore, the host CPU 1, the graphic controller 2, the NO.1 frame buffer 3, and the NO.2 frame buffer 13 are all connected to a bus line 9.

FIG. 2 is a sample drawing showing graphic images displayed on a screen in the apparatus shown in FIG. 1. In FIG. 2, one screen information of a graphic image of a body to be displayed in red, stored in NO.1 frame buffer 3, is indicated as a graphic image. And another screen information of a graphic image of another body to be displayed in blue, stored in NO.2 frame buffer 13, is indicated as another graphic image. Screen information obtained by combining the screen information stored in NO.1 frame buffer 3 and the screen information stored in NO.2 frame buffer 13, is displayed on the video display unit 10 as a graphic image, indicating the place where the two bodies are overlap in purple.

The apparatus for graphically checking for interference between a workpiece and a tool in accordance with a machining program in a prior art, as can be seen in FIG. 2, is provided with screen information for as many of bodies between which interference will be checked. It is also provided with frame buffers for the screen information that stores the same, and a video display unit that displays screen information after combining screen information for each body stored in the each frame buffer. It checks for interference between the bodies by means of a comparator that detects the overlap of graphic images of bodies in the screen information. This apparatus for graphically checking for interference between a workpiece and a tool detects the interference when pixel information concurrently transmitted from NO.1 frame buffer 3 and NO. 2 frame buffer 13 are different. Namely, in the example shown in FIG. 2, the apparatus for graphically checking for interference between a workpiece and a tool detects interference when the red pixel data output from NO.1 frame buffer 3 and the blue pixel data output from NO.2 frame buffer 13 overlap.

However, the prior art apparatus for graphically checking for interference between a workpiece and a tool in a has to be provided with as many frame buffers as there are bodies between which interference will be checked, and has to store the screen information of each body into each frame buffer. Therefore, there are problems that the size of the capacity of the frame buffers is increased, and that a long time and considerable manual labor are required for making the screen information, because operators have to prepare a number of screen information images equal to the number of parts, such as a workpiece and tools for checking for interference.

DISCLOSURE OF THE INVENTION

Therefore, in the light of the above mentioned problems, it is an object of the present invention to provide an apparatus for graphically checking for interference between a workpiece and a tool in accordance with a machining program that has a single frame buffer storing screen information for a plurality of graphic images of bodies thereby saving time and labor for making the screen information.

FIG. 3 is a drawing showing the basic structure of an apparatus for graphically checking for interference between a workpiece and a tool according to the present invention.

In order to solve the above mentioned problems, in the apparatus for graphically checking for interference between a workpiece and a tool according to the present invention includes a host CPU 31, a single screen information output circuit 35 including a frame memory, a latch 37 and a comparator 38. The host CPU 31 previously sets more than two different kinds of pixel data (color information) for checking for the interference, namely, between a plurality of bodies having a kinds of determined length pixel data for graphic display, in a comparator 38. The screen information output circuit 35 is connected with the host CPU 31, stores screen information consisting of a plurality of frames of pixel data in a frame memory in itself, and continually serially outputs the stored screen information. The latch 37 receives pixel data (color information) continually output from the screen information output circuit 35, latches and updates each unit of pixel data. The comparator 38 compares current pixel data received from the screen information circuit 35 with pixel data received from the latch 37 which is of a frame previous to the frame of current pixel data, namely, compares two adjacent frames of pixel data (color information), then detects interference between the two frames and outputs a signal to the host CPU 31 when two kinds of the pixel data (color information) for checking interference that are previously set by the host CPU 31, are adjacent.

The apparatus for graphically checking interference according to the present invention includes the means, namely the latch circuit 37, for latching and updating the pixel data of screen information continually output from the screen information output circuit 35, the means, namely the comparator 38, for comparing one by one current pixel data output from the screen information output circuit 35 with the pixel data output from the latch circuit 37 which are previous to the current pixel data individually, in which more than two kinds of pixel data which will be checked for interference are previously set by the host CPU 31, for detecting interference when two different pixel data are adjacent, and for outputting a signal to the host CPU 31.

BRIEF DESCRIPTION OF DRAWINGS

FIG. 3 is a drawing showing the basic structure of an apparatus for graphically checking for interference between a workpiece and a tool according to the present invention;

FIG. 4 is a drawing showing the structure of an embodiment of an apparatus for graphically checking for interference between a workpiece and a tool of a machining program according to the present invention;

FIGS. 5A-1 and 5A-2 show a graphic display when two bodies to be checked are separate;

FIGS. 5B-1 and 5B-2 show a graphic display when the two bodies are adjacent; and, FIGS. 5C-1 and 5C-2 show a graphic display when the two bodies are overlapped.

BEST MODE FOR CARRYING OUT THE INVENTION

Figure 1:
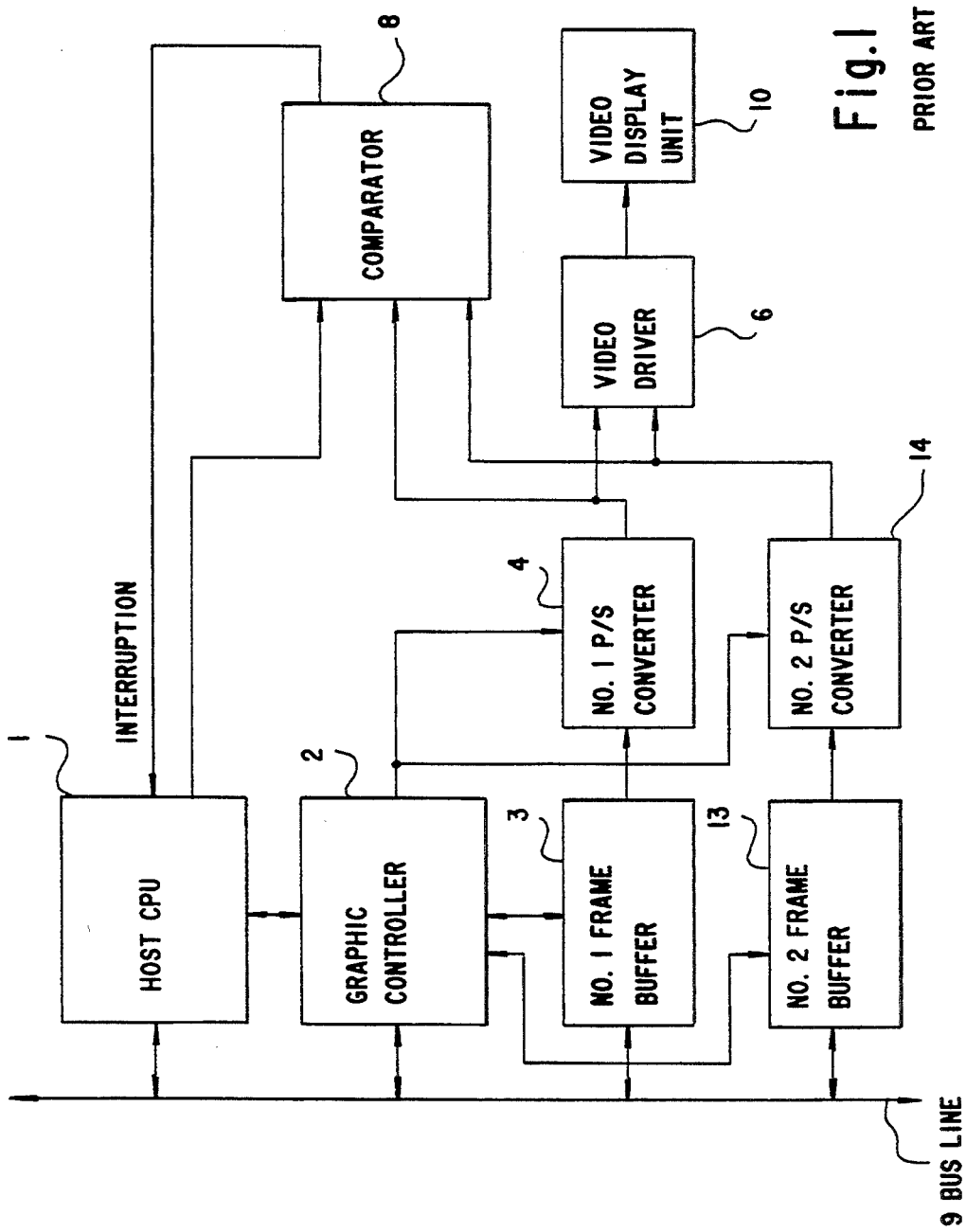
FIG. 1 is a drawing showing the structure of an apparatus for graphically checking for interference between a workpiece and a tool of a machining program in the prior art.

FIG. 4 is a drawing showing the structure of an embodiment of an apparatus for graphically checking for interference between a workpiece and a tool of a machining program according to the present invention. In FIG. 4, reference numerals the same as those in FIG. 3 indicate the same elements. Explanation of FIG. 4 will now be described hereinafter. The screen information output circuit 35 in FIG. 3 is composed of graphic controller 32, a frame buffer 33 and a P/S converter 34 in FIG. 4. The host CPU 31 controls the general operations of the numerical controller, is connected to the graphic controller 32 and determines the screen information after defining the shapes of workpieces, chucks and cutting tools. Furthermore, the host CPU 31 can produce more than two body color information sets representing different bodies on which interference will be checked, namely, any two or more combinations of body colors from red, green and blue. The graphic controller 32 operates to memorize screen information, determined by the host CPU 31, which is received in the frame buffer 33 via the bus 39.

The pixel data screen information stored in the frame buffer 33 are output as parallel signals to the P/S converter 34. The P/S converter 34 outputs serial signals after converting the parallel signals to the serial signals in accordance with the command signal from the graphic controller 32. A video driver 36 receives the serial signals from the P/S converter 34 and outputs three color (R,G,B) video signals to a video display unit 40.

The video display unit 40 displays the screen information output from the video driver 36. The latch circuit 37 latches and updates the pixel data which are continually output from the P/S converter 34 and which are stored as the screen information in the frame buffer 33. In this embodiment, three bits of color information (R,G,B) per a pixel are output from the P/S converter 34. The comparator 38 compares the output from the P/S converter 34 with the output from the latch circuit 37 and outputs a signal to the host CPU 31 when interference is detected.

To detect interference, more than two body color information sets for checking interference are previously produced by the host CPU 31. Namely, at least two color information bits out of R, G, B are previously selected and are stored in the comparator 38 by the host CPU 31. Interference is detected when the different bodies are adjacent, i.e., different kinds of color information bits are detected at adjacent pixel data.

If the signal from the comparator 38 is used as an interruption signal, then the actual interference position, where different colors are adjacent, can be observed by stopping the screen when the interference is detected, and the machining NC program can be properly corrected since actual interference positions can be confirmed by data analysis.

Furthermore, the apparatus for graphically checking for interference between a workpiece and a tool according to the present invention can also be realized without having a graphical controller 32, but by having a host CPU 31 with the functions of a graphical controller 32 as shown in FIG. 4.

Figures 1, 5A:
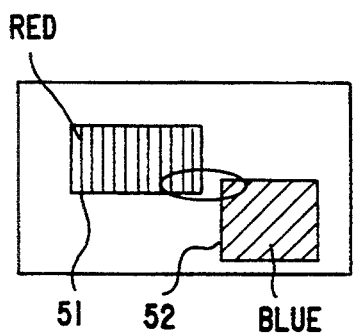
Figures 2, 5A:
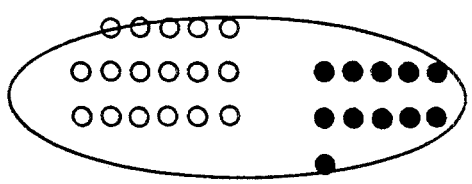
Figures 1, 5B:
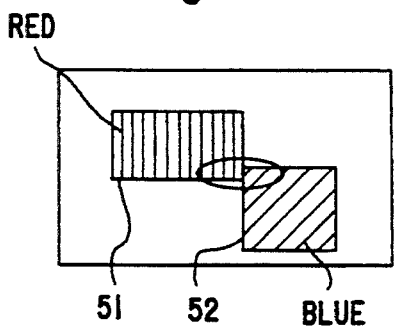
Figures 2, 5B:
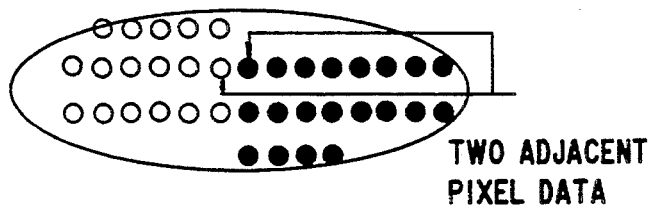
Figures 1, 5C:
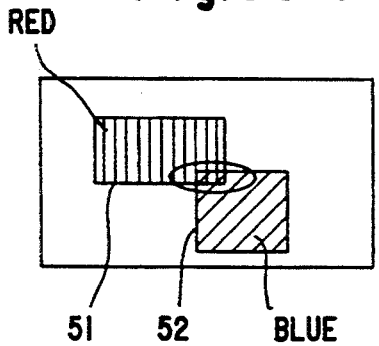
Figures 2, 5C:
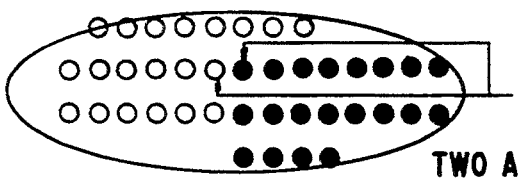
FIG. 2 is a drawing showing graphic images displayed on a screen in the apparatus shown in FIG. 1.

FIGS. 5A, 5B and 5C indicate three modes of two bodies between which the interference will be checked. The mode of operation of the apparatus shown in FIG.

4 will be explained hereinafter with reference to those figures.

FIG. 5A-1 shows a graphic display when two bodies for checking the interference are separate, FIG. 5B-1 shows a graphic display when the two bodies are adjacent, and FIG. 5C-1 shows a graphic display when the two bodies are overlapped.

In FIG. 5A-1 body 51 is indicated by red, while a body 52 is indicated by blue. The host CPU 31 previously set red and blue in the comparator 38. Corresponding to the output from the P/S converter 34, FIG. 5A-2 indicates that red and blue pixels are in separated positions, FIG. 5B-2 indicates that red and blue pixels are in adjacent positions, and FIG. 5C-2 indicates that red and blue pixels are overlapped on the screen respectively. In other words, corresponding to the output from the P/S converter 34, FIG. 5A indicates red and blue pixels are output in a different time, FIG. 5B indicates blue pixels are output just adjacent to red pixels, and FIG. 5C indicates red pixels are independently output at first, then red and blue pixels are output simultaneously, and blue pixels are independently output at the end. The latch 37 outputs pixel information that are one pixel delayed compared to the pixel information output from the P/S converter 34. The comparator 38 outputs an alarm signal to the host CPU 31 in the cases of FIG. 5B and FIG. 5C after detecting that two adjacent pixel information sets are different, because two adjacent pixel information sets are red and blue in these cases, and they are previously set by the host CPU 31 as the color information for checking interference.

Other methods for checking for interference in a machining program by software other than the apparatus according to the present invention can be considered. Namely, one method may include the steps of copying image screen information by combining two respective bodies for checking interference; then comparing the screen information before copying, namely, the information of each body, with the screen information after copying, namely, that combined information; and detecting the interference between the two bodies. Another method may include the steps of comparing the screen information of each body with the screen information that combines information of the two respective bodies for checking interference, before the copying; and detecting the interference.

According to these software methods, the host CPU represents (copies) the cutter (cutting tool) shape previously defined on the frame buffer, and continually copies the cutter shape along the cutter moving route, then operators can observe by naked eyes as if the cutter is moving, since, for example, the course where the cutter, as a body, moves is known by the host CPU.

When the colors are set such as red for the cutter, blue for a chuck, and purple for the interference portion between the cutter and the chuck, the host CPU detects the interference in the course of continual coping, by detecting the fact that red interfered with blue and that the interference portion changed to purple in the frame buffer, and the host CPU sets the alarm bit via the software.

In this case, each bit data in some square area is checked to detect the interference. To accomplish this process by software, a long processing time is required, the scan time of the host computer that executes the software is longer than that of video signal for the CRT screen, which means that processing time of the software requires more time than hardware processing time. Furthermore, the software process is complicated and it requires time, therefore it is not suitable to realize the apparatus for detecting the interference although there is a merit that graphic image information of a plurality of bodies can be stored in a frame buffer as one screen information, which is the same merit of the present invention. Therefore, the apparatus for detecting interference according to the present invention may be the best of all the apparatus which use current electronic equipment, electronic elements or the like.

As heretofore explained, according to the apparatus for graphically checking interference between a workpiece and a tool of the present invention, it is not necessary to provide the same number of screen information sets as the number of bodies for checking interference. The apparatus only requires one screen information set for a plurality of kinds of bodies, so that time and labor can be saved for preparation and a quick and effective interference check can be realized.

Furthermore, according to the apparatus for graphically checking interference of the present invention, by transmitting an interruption signal to the CPU after detecting the interference, the video screen can be stopped to observe the standstill state of the interference and different colors in adjacent positions can be actually observed and the interference position can be confirmed. And accurate feedback for correcting the machining program can be accomplished since the actual interference position can be confirmed by data analysis.

We claim:

1. Apparatus for graphically checking for spatial interference between a plurality of bodies independently movable with respect to each other comprising:

CPU means for creating separate time sequential two dimensional graphic display pixel images of spatial positions of each of a plurality of independently movable bodies and for assigning separate pixel identification data to images of each body;

memory means for storing superimposed pixel images of each of said bodies created at a given time as a single frame, wherein superimposed pixels of overlapping images are stored as a combination of pixel data of superimposed pixels;

converter means for scanning sequentially each row of pixels of a stored frame; and comparator means for comparing each scanned pixel with an immediately following scanned pixel one by one and for determining if a difference of pixel data exists between two adjacently positioned pixels, and for providing an interruption signal to said CPU means identifying possible spatial interference when such a difference exists.

2. Apparatus for graphically checking for spatial interference between elements of a numerically controlled machine having a graphic display system comprising:

CPU means for controlling operation of said numerically controlled machine;

graphic controller means connected to said CPU means for controlling a graphic display;

frame buffer means connected to said graphic controller means for storing frames of screen information of each of said machine elements having graphic images of each element represented by pixels assigned different identification data by said CPU means;

a parallel to serial converter means for receiving parallel pixel data of said graphic images from said frame buffer means and for outputting said pixel data in serial form in accordance with command signals from said graphic controller means;

latch circuit means for receiving pixel data output from said converter means, latching and updating said data one by one; and comparator means for comparing one by one each pixel data serially output by said converter means with that output one pixel earlier held in said latch circuit means and for determining from a difference in pixel data of two adjacent pixels that interference between machine elements exists, and for outputting an interruption signal to said CPU means in response to a determination of interference.

3. Apparatus as claimed in claim 2, further comprising:

video driver mean connected to said converter means for receiving serial pixel data and outputting a graphic display image; and video display means connected to said video driver means for displaying said graphic display image.

* * * * *